United States Patent [19]
Zavracky et al.

[11] Patent Number: 5,642,129
[45] Date of Patent: Jun. 24, 1997

[54] COLOR SEQUENTIAL DISPLAY PANELS

[75] Inventors: Matthew Zavracky, Plympton; Wen-Foo Chern, Wayland, both of Mass.

[73] Assignee: Kopin Corporation, Taunton, Mass.

[21] Appl. No.: 216,817

[22] Filed: Mar. 23, 1994

[51] Int. Cl.[6] .................................................. G09G 3/36
[52] U.S. Cl. ........................... 345/100; 345/92; 345/98; 345/88
[58] Field of Search ............................ 345/89, 87, 88, 345/92, 90, 91, 100, 204, 150, 151; 437/63; 359/53; 348/758

[56] References Cited

U.S. PATENT DOCUMENTS

| | | | |
|---|---|---|---|
| 5,101,197 | 3/1992 | Hix et al. ................................. | 345/87 |
| 5,105,187 | 4/1992 | Plus et al. ............................... | 345/92 |
| 5,225,823 | 7/1993 | Kanaly .................................... | 345/89 |
| 5,243,455 | 9/1993 | Johnson et al. ......................... | 359/93 |
| 5,256,562 | 10/1993 | Vu et al. ................................. | 437/86 |
| 5,317,236 | 5/1994 | Zavracky et al. ...................... | 315/169.3 |
| 5,347,378 | 9/1994 | Handschy et al. ...................... | 359/53 |
| 5,363,225 | 11/1994 | Minamihara et al. ................... | 345/92 |
| 5,410,370 | 4/1995 | Janssen .................................. | 348/756 |
| 5,416,514 | 5/1995 | Janssen et al. ......................... | 348/196 |
| 5,444,557 | 8/1995 | Spitzer et al. .......................... | 359/59 |

OTHER PUBLICATIONS

Janssen, P. "A novel single light valve hight brightness HD Color Projector," Society For Information Display Symposium, France, Sep. 1993, Philips Lab, Briarcliff, USA, pp. 249–252.

*Primary Examiner*—Curtis Kuntz
*Assistant Examiner*—Vivian W. Chang
*Attorney, Agent, or Firm*—Hamilton, Brook, Smith & Reynolds, P.C.

[57] ABSTRACT

A color active matrix display system allows random access of pixel electrodes. The control electronics is fabricated with the active matrix circuitry using single crystal silicon technology. The control electronics includes a random access data scanner and random access spec scanners. By selectively actuating pixel electrodes in the active matrix display region, compressed video information can be directly displayed on the active matrix display panel. Color stripes are used to generate sequential color systems to produce a color image from the active matrix display panel.

28 Claims, 9 Drawing Sheets

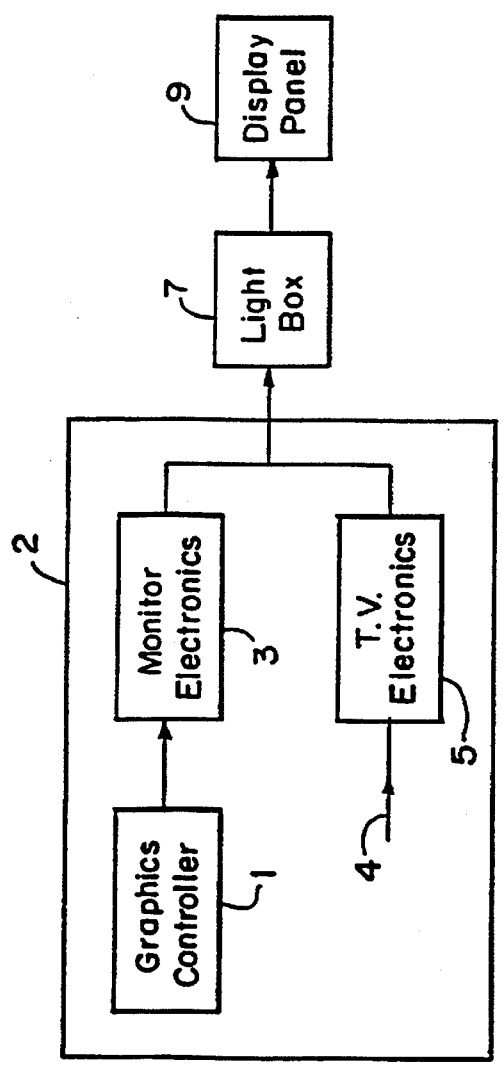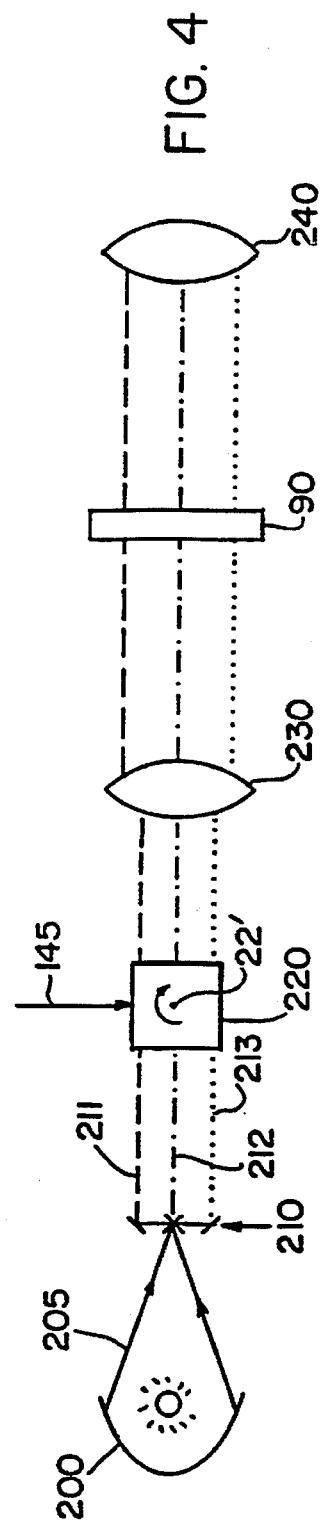

COLOR SEQUENTIAL DISPLAY PANELS

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will alter the polarization of light in the material when an electric field is applied across the material between the circuit panel and a ground affixed to the filter plate. Thus, when a particular pixel of the display is turned on, the liquid crystal material rotates polarized light being transmitted through the material so that the light will pass through the second polarizing filter.

The primary approach to TFT formation over the large areas required for flat panel displays has involved the use of amorphous silicon, which has previously been developed for large-area photovoltaic devices. Although the TFT approach has proven to be feasible, the use of amorphous silicon compromises certain aspects of the panel performance. For example, amorphous silicon TFTs lack the frequency response needed for large area displays due to the low electron mobility inherent in amorphous material. Thus the use of amorphous silicon limits display speed, and is also unsuitable for the fast logic needed to drive the display.

As the display resolution increases, the required clock rate to drive the pixels also increases. In addition, the advent of colored displays places additional speed requirements on the display panel. To produce a sequential color display, the display panel is triple scanned, once for each primary color. For example, to produce color frames at 20 Hz, the active matrix must be driven at a frequency of 60 Hz. In low light conditions, the active matrix may need to be driven at 180 Hz to produce a 60 Hz color image.

One such color sequential system has been described by Peter Jansen in "A Novel Single Light Valve High Brightness HD Color Projector", Society For Information Display (SID), Technical Paper, France 1993. In this system, dichroic filters are used to separate light from an arc lamp into three primary colors that are shaped into rectangular stripes which are sequentially scanned across a single light valve using a rotating prism. The control circuitry for this system was fabricated using discrete components for the active matrix, the column drivers and three commercially available random access row drivers mounted separately onto a glass panel with the column fabricated in poly-silicon and connected to the drivers using pin connections.

Owing to the limitations of amorphous silicon, other alternative materials include polycrystalline silicon, or laser recrystallized silicon. These materials are limited as they use silicon that is already on glass, which generally restricts further circuit processing to low temperatures.

A continuing need exists for systems and methods of controlling pixels and drive circuits of panel displays having the desired speed, resolution and size and providing for ease, and reduced cost of fabrication.

SUMMARY OF THE INVENTION

A preferred embodiment of the invention is an integrated circuit random access video display for displaying an image from a video source. An active matrix drive circuit and an active matrix display region are fabricated in a common integrated circuit module. The integrated circuit module can be formed in a silicon-on-insulator (SOI) structure that is transferred onto an optically transmissive substrate such as glass. A light box module translates a digital video signal into an active matrix drive signal. The active matrix display region has an array of pixel electrodes and an array of pixel transistors registered to the array of pixel electrodes. The pixel transistors actuate the pixel electrodes in response to the active matrix drive signal from the control circuit. The integrated circuit module can then be used to fabricate a liquid crystal display device for use in a projection display system.

In particular, the control circuit includes one (or more) random access select scanner and a column driver. The select scanner can enable a row of pixel transistors at random. The column driver provides actuation signals at random. The column driver provides actuation signals to the transmission gates that allow video data to flow into the enabled pixel transistors. Timing information for the select scanner and the column driver is provided by a control signal generator, which is also fabricated in the integrated circuit module. The circuit module can also include a video memory, D/A converters, and at least one frame buffer for storing at least one video signal from digital data representing the video image. In a particular preferred embodiment, the display generates color images and there is a frame buffer for the digital data, associated with each primary color (e.g., red, green, blue). In another preferred embodiment, the frame memory is partitioned into channels. The column driver preferably actuates individual pixel electrodes that can be randomly selected by the control circuit.

In a preferred embodiment of the invention, the video source is any analog or digital video source including a computer, television receiver, high-definition television (HDTV) receiver or other similar sources. In particular, the active matrix display region is compatible with HDTV formats and is a 1280-by-1024 pixel array. The pixels have a pitch that is preferably in the range of 10–30 microns such that four integrated circuit modules can be fabricated on a single five inch wafer.

In a particular preferred embodiment, the control circuit generates compressed video data to obtain further bandwidth reductions. As such, only pixels whose data value has changed since the last video frame needs to be updated. Preferably, the control circuit is compatible with standard active matrix drive techniques.

As referenced above, a preferred embodiment of the invention includes a process of fabricating an active matrix display in which a circuit is fabricated with an SOI structure and then transferred onto an optically transmissive substrate. The pixel electrodes can be fabricated prior to transfer using processes described in U.S. Pat. No. 5,206,749, the contents of which are incorporated herein by reference. The pixel electrodes can be made of a transmissive silicon material or a conductive metal oxide such as indium tin oxide. The pixel electrodes can also be formed after transfer of the circuit and connected through the insulator as described in U.S. Pat. No. 5,226,562 the contents of which are incorporated herein by reference. Other methods for fabricating pixel electrodes are described by Zavracky et al. U.S. Ser. No. 08/215,555 filed on Mar. 21, 1994 and entitled "Methods of Fabricating Active Matrix Pixel Electrodes", the contents of which are incorporated herein by reference.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular color sequential display panels embodying the invention is shown by way of illustration only and not as a limitation of the invention. The principles and features of this invention may be employed in varied and numerous embodiments without departing from the scope of the invention.

FIG. 1 is a block diagram of a control system for a color active matrix display.

FIG. 4 is a schematic diagram illustrating a preferred embodiment of a color sequential display system using a scanning prism.

DETAILED DESCRIPTION OF PREFERRED EMBODIMENTS OF THE INVENTION

Figure 2:
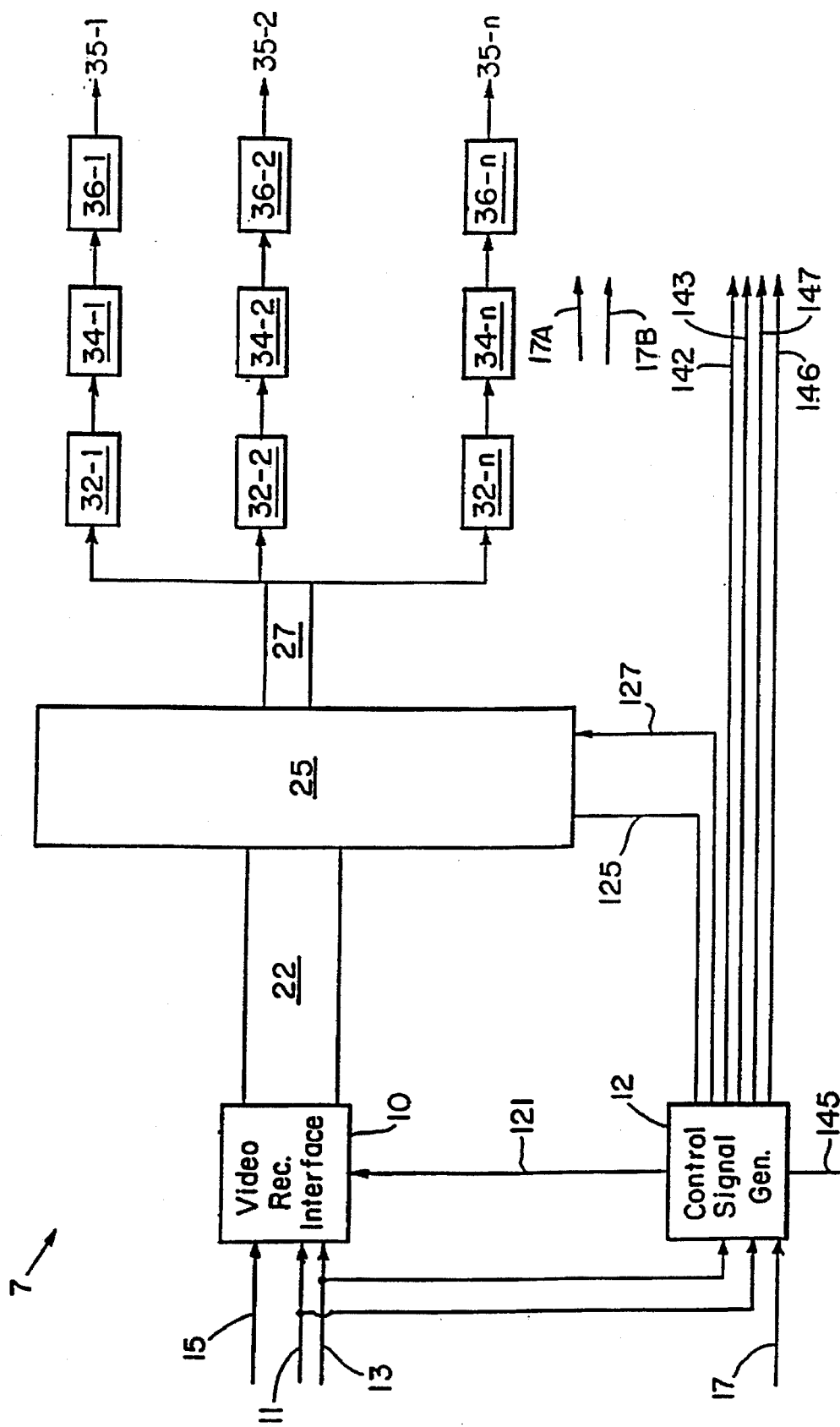
FIG. 2 is a block diagram of the light box circuitry 7 of FIG. 1.

A preferred embodiment of a control system for a color active matrix display is shown in FIG. 1. A video signal adaptor 2 provides color video signals to a light box module 7. The video signal adaptor 2 can include any analog or digital video signal source 1,4 including a Video Graphics Array (VGA) adaptor, the Apple™ Macintosh™ family of computers, a National Television Systems Committee (NTSC) composite video source, a High-Definition Television (HDTV) receiver, a high-resolution professional display adapter, a Charge-Coupled-Device (CCD), or other similar sources. As illustrated, the work station or computer-generated video signals from a graphics controller 1 are processed by a monitor electronics module 3 to provide the color video signal, typically a 24 bit RGB signal with Hsync and Vsync information, to the light box 7. Similarly, television broadcasts 4 are processed by a television electronics module 5 to provide the color video signal to the light box module 7. In a particular preferred embodiment, an active matrix display panel 9 is adapted as a computer-controlled light valve that displays color images to a viewer. The images can be displayed directly to the viewer or by projection onto a viewing surface.

Unlike CRTs, flat panel displays have pixels where the analog RGB signal must contain information on screen position. For the position information to be accurate, each scan line of the analog RGB signal must be divided into discrete values. That task is performed by the video signal adaptor 2, which provides digital color data for each pixel.

The active matrix display panel 9 operates as a multi-frequency display device. Video signals from the video signal source may not be synchronized to a known fixed frequency. A change in the video mode can change the resolution of the data, measured in pixels. For example, a VGA adaptor 1 generates synchronization signals that vary depending on the particular video mode in which the adaptor is operating. A standard VGA adaptor 1 can generate a vertical synchronization (Vsync) frequency between about 56 and 70 Hz and a horizontal synchronization (Hsync) frequency between about 15 and 35 Khz. For professional display purposes (e.g., CAD/CAM) the Hsync and Vsync frequencies can be higher than described. To handle current high resolution display applications, the display device can preferably adapt to Vsync frequencies up to about 100 Hz and horizontal synchronization frequencies up to about 66 Khz. In addition, a change in the video mode can also invert the polarities of the synchronization signals. Consequently, a preferred embodiment of the invention adapts to changes in the synchronization signals caused by changes in the video mode.

FIG. 2 is a block diagram of the light box module 7 of FIG. 1. The light box module 7 receives the Hsync signal 11, the Vsync signal 13 and a color data signal 15, which is typically operating at 300 MHz from the video signal adaptor 2. In a preferred embodiment of the invention, the color data signal 15 represents the color of each pixel as a 24-bit digital value. The video signals 11,13,15 are received by a video receiver interface 10, which formats the color data signal 15 for storage in a video frame memory 25. In particular, the video receiver interface 10 converts the serial color data input stream 15 into parallel data 19 for storage in the video frame memory 25. The Hsync signal 11 and the Vsync signal 13 are also provided to a control signal generator 12.

The control signal generator 12 generates control signals for operating the active matrix display panel 9 in response to the Hsync 11 and Vsync 13 signals from the video signal source 2. In a preferred embodiment, the control signal generator 12 permits display of video images at a horizontal resolution up to at least 1280 pixels and a vertical resolution up to at least 1024 pixels (1280 H×1024 V). In another preferred embodiment, the aspect ratio of the active matrix display panel 9 is selected to be compatible with High-Definition Television (HDTV) formats, such as 1920 H×1080 V, 1824 H×1026 V and 1600 H×900 V. Furthermore an HDTV-compatible 1280 H×720 V image can be formed in a 1280 H×1024 V display or a 1280 H×1024 V image can be formed in an 1824 H×1026 V or 1920 H×1080 V display. It is understood that other video modes having different video rates and resolutions can be supported as well, with minor modifications.

Figure 3:
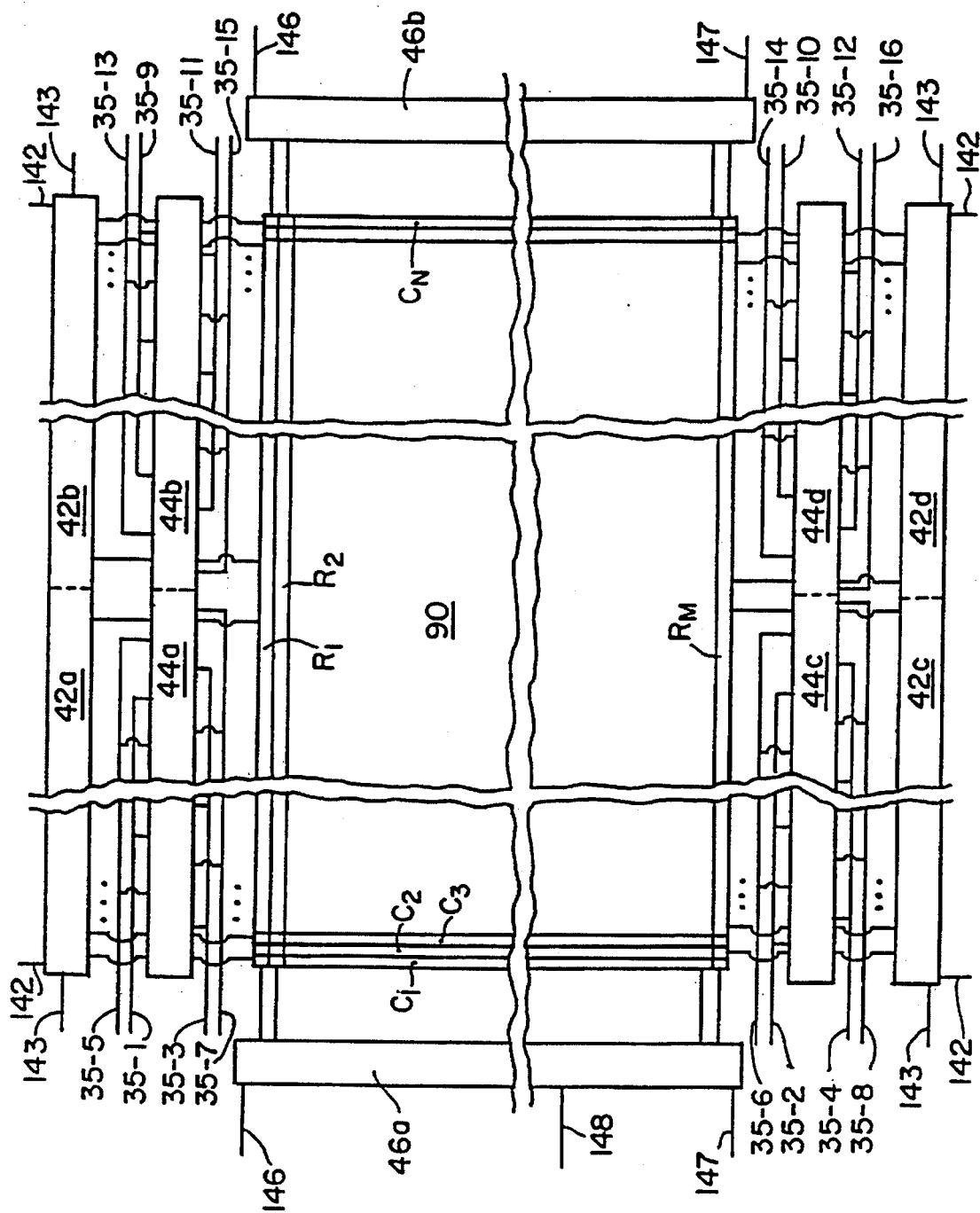
FIG. 3 is a schematic block diagram of a display panel drive circuit.

The control signal generator 12 converts the synchronization signals 11,13 into pixel timing information for the pixel columns and select line timing information for the pixel rows of the active matrix. The control signal generator 12 provides control registers to adjust and delay the pixel clock 143, pixel data 142, select clock 147, and select data 146 so the image generated by the video source 1,4 (e.g. VGA, HDTV) can be precisely mapped to the active matrix pixel resolution (e.g., 1280 H×1024 V). The control signal generator 12 provides a pixel data signal 142 and a pixel clock signal 143 to a data scanner 42 (FIG. 3). The video signal generator 12 also provides a select line data signal 146 and a select line clock signal 147 to select scanners 46 (FIG. 3). Preferred embodiments of the invention supply one or four clocks for each clock signal 143,147. By supplying four clocks for each clock signal 143,147, the circuitry of the scanners 42,46 can be simplified. This is especially important where the scanners 42,46 are monolithically fabricated on an SOI structure with the active matrix region 90 and the light box module 7 is a discrete component. Finally, the control signal generator 12 provides a frame switch signal 121 to the video receiver interface 10. The data scanner clock and data pulse rate is determined by the number of parallel video input channels. The data scanner can scan sequentially, or alternatively, it can use a random access procedure. Note that in another embodiment, the select data 146 or select clock 147 can be used as a serial address line.

Because the video data is received in digital form, the video receiver interface 10 can generate normal or inverted video data signals in response to the frame switch signal 121 from the video signal generator 12. Preferably, the polarity of the video signal is switched every video field (every Vsync). The switch can occur more or less often, as might be desirable for crosstalk or other purposes. The frame switch signal 121 is synchronized to the frame rate.

In a preferred embodiment, a column inversion technique is used to reduce crosstalk between select lines to reduce or avoid the production of a DC offset voltage. A video switch provides an alternating opposite polarity for the column pixels. The even column pixels are operated at the opposite polarity of the odd column pixels. The polarities of the column pixels are switched on each sequential frame. For example, on one frame even column pixels operate at a positive polarity and odd column pixels operate at a negative polarity relative to the display common electrode. On the next sequential frame, the polarities of the odd and even columns are switched. As a result, the even column pixels operate at a negative polarity and the odd column pixels operate at a positive polarity.

Another preferred embodiment of the invention uses a frame inversion technique instead of column inversion. Using frame inversion, each column during any one frame has the same polarity. On alternating frames, as clocked by the frame switch signal 121, the polarity of each column is reversed. In that way, the polarity of the entire active matrix region 90 is inverted on each successive frame. This frame inversion embodiment does not require the use of distinct odd and even data registers or video drive lines.

The control signal generator 12 performs non-linear scanning, which is a function of the rotating prism (and liquid crystal speed). The liquid crystal speed can vary due to temperature and the color of light being transmitted. The control signal generator 12 compensates for these speed variations when producing control signals.

The control signal generator 12 can also adapt the writing of each line. For example, in a preferred embodiment of the invention the image is written for each select line from the edges of the display panel 9 toward the center of the display panel 9. Another preferred embodiment writes the video data from the center of the display panel 9 outward toward the edges. In yet another preferred embodiment, the video data is scanned left to right across the display panel. These various video data writing techniques are provided under the control of the control signal generator 12.

The panel drive circuit (FIG. 3) can also receive control interface signals from a user at 17A for adjusting hue, contrast, and brightness and at 17B for inversion, gamma correction and liquid crystal voltage offset.

In a preferred embodiment of the invention, the display panel 9 is driven at 60 Hz frame rate. During each frame, the display panel 9 is overwritten with data for the three primary colors. Consequently, there are 180 subframes displayed per second. This produces a pixel data rate of about 300 Mhz. Because the video data is in digital form, it must be converted to analog signal by digital to analog converters (DACS). However, it would require a super-high speed DAC to operate at 300 Mhz. Consequently, a preferred embodiment of the invention separates the video signal into n channels. The number of channels is a design decision where an increase in the number of channels becomes more difficult to manage while the operating speed of the DACs is lowered. Preferably, there are sixteen (n=16) channels of video data and each channel has its own DAC operating at one-sixteenth of the total pixel data rate.

Accordingly, the video receiver interface 10 partitions the incoming video data signal 15 into channels of video data. Each channel carries video data at an offset from the edge of the panel so that the channels stagger the video data for the pixels across the display. For example, with the number of channels being 16 (n=16), the first channel can carry data for every 16 pixels starting from the left-most pixel ($C_1$) and the second channel can carry data for every 16 pixels starting form the second left-most pixel ($C_2$), etc. The offset for each channel can be selected by the video receiver interface 10.

The video data are fed through input bus 22 to frame memory 25. The video memory 25 is addressed by an addressing signal 125 from the control signal generator 12.

The output bus 27 delivers the addressed video data from the video memory 25 to a line memory 32 for each channel. A DAC 34 for each channel reads the video data from the line memory 32, converts the digital video data to an analog video signals input to the panel drive circuit. The analog video signals 35-1, . . . , 35-n are used to drive the columns 44 of the display panel 9.

The data supplied from the bus 27 at any one time is either red data from a red frame buffer, or blue data from a green frame buffer, or blue data from a blue frame buffer. The appropriate data value is retrieved through bus 27 by the output color select signal 127 from the control signal generator 12.

In a preferred embodiment where the inputs are red, green, and blue data, the color select signals 123,127 are two-bit data signals. The chosen data value for each channel is converted back into an analog video signal by the channel DAC 34.

FIG. 3 is a schematic block diagram of the active matrix drive circuitry. The drive circuitry can incorporate gamma corrections and shading corrections as noted above. Gamma corrections may be required if the response time for each primary color in the liquid crystal varies due to the color. Shading correction may be required to compensate for the length of time that an image row is displayed on the panel 9. For example, there can be a variation between the time a top row is displayed and the amount of time a bottom row is displayed such that the top row, unless corrected, will appear brighter than the bottom row. The drive circuitry can also incorporate inversion techniques and offsets.

A video signal bus 35 carries the analog video signals from the DACs 34 to the column drivers 44. Because signal interference and signal loss can occur as the analog video signal crosses each signal line in the signal bus 35, the channels of video signals are arranged to reduce interference. As illustrated, there are four column drivers 44a–44d, two column drivers 44a,44b at the top of the active matrix region 90 and two column drivers 44c,44d at the bottom of the active matrix region 90. Each channel is allocated to one of the column drivers 44 such that each column driver 44 receives video from four channels. As illustrated, the top column drivers 44a,44b receive video from the channels that drive the odd-numbered columns and the bottom column drivers 44c,44d receive video from the channels that drive the even-numbered columns. As shown, no video signal has to cross the path of more than one other video signal.

The illustrated arrangement of column drivers is particularly suited for edge-to-center and center-to-edge video writing, although the data can also be written from left-to-right or right-to-left. It should be understood that more or less than four column drivers 44 can be employed in preferred embodiments of the invention.

The data scanners 42 are responsive to the pixel data signal 142 and the pixel clock signal 143. The data scanners 42 can use a shift register array to store data for each scan. An odd shift register array can be used to store data to odd column pixels and an even shift register array can be used to store data to even column pixels. As illustrated, there are left and right odd data scanners 42a,42b and left and right even data scanners 42c,42d.

The column drivers 44 selected by the data scanner 42 will transmit video data to the selected column C. in the active matrix region 90. The select scanner 46 determines by control lines $R_M$ which pixels accept this column $C_N$ data.

To reduce signal loss across the active matrix region 90, the select lines are driven from both sides by select scanners 46. As viewed in FIG. 3, a left select scanner 46a and right select scanner 46b are connected to the select data line 146 and the select clock line 147. A third enabling line 148 can also be used. The left select scanner 46a provides a select line signal at the end of the select line nearest the lowest-valued pixel column ($C_1$) and right select scanner 46b provides a select line signal at the end of the select line nearest the highest-valued pixel column ($C_N$). Thus, an identical select line signal is supplied at both ends of the select line.

The shift registers of the data scanner 42 and the select scanners 46 are preferably dynamic shift registers. The dynamic shift registers rely on capacitor storage without leakage. However, dynamic shift registers are susceptible to leakage, especially when they are exposed to light. Hence, light shields are needed to protect the scanners 42,46 from exposure to light.

In another preferred embodiment of the invention, the select scanners 46 are random access select scanners. Each random access select scanner can be addressed to drive any row of pixels driving any pixel clock period. As such the select scanners 46 need not include shift registers. The select line is directly provided by the row select signal 146, which is implemented as an address bus.

In another preferred embodiment of the invention, the data scanner 42 is a random access data scanner to select any column of pixels for any clock period. When used in conjunction with random access select scanners, the light box module 7 can actuate any pixel on the active matrix region 90 during any pixel clock period. This embodiment requires the use of double gate pixel transistors for receiving two digital select inputs (row select and column select) to signal pixel actuation with the video signal for the selected pixel. With a fully random access active matrix region 90, data compression techniques with burst mode refresh of the video frame memory 25 can be used to write changed pixels to the display.

In a preferred embodiment of the invention, the panel drive circuitry of FIG. 3 is fabricated as an integrated circuit with the active matrix region 90. The integrated circuitry is preferably fabricated in single crystal silicon having a silicon-on-insulator (SOI) structure using the fabrication and transfer procedures described previously. By fabricating the row and column drive circuitry 42,44,46 in single crystal with the active matrix region 90, the size of the display panel is not constrained by the connecting pins for the various discrete components. The integrated fabrication also increases the operating speed of the display over displays constructed from discrete components. Furthermore, the drive circuitry can be optimized to increase display performance. For example, it is easier to construct a 35 mm format-compatible 1280 H×1024 V display panel with dual select scanners through integrated fabrication than it is using discrete components.

The pixels in a preferred embodiment are approximately 26 microns square. Consequently, a 1280 H×1024 V active matrix with the control system can be fabricated such that there are two such integrated circuits on a four inch wafer, four circuits on a five inch wafer and six circuits on a six inch wafer. In another preferred embodiment of the invention, only the select scanners 46, the data scanner 42 and the column driver 44 are integrated on chip with the active matrix region 90.

FIG. 4 is a schematic diagram illustrating a preferred color sequential display system according to the invention. As illustrated, a light source 200 having a reflector generates a beam of white light 205 that is focused on a dichroic mirror assembly 210. The dichroic mirror assembly 210 separates the white light 205 into three parallel strips of primary color light 211,212,213 separated by unlit black bands 214. Preferably, the primary color light is red light 211, green light 212, and blue light 213. The strips of red, green and blue light become incident on a prism 220 which is rotatably about a center axis 225 under the control of the drive signal 145 from the control system of FIG. 2. The prism 220 is rotated such that the color strips 211, 212, 213 scan vertically downward relative to the figure.

Figure 5A:
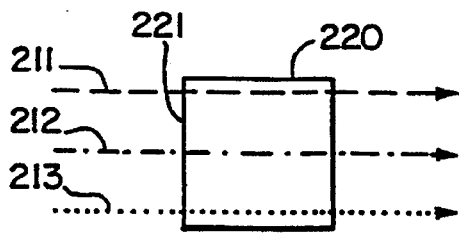
FIGS. 5A–5C are views of the scanning prism 120 of FIG. 3 illustrating color scanning.
Figure 6A:
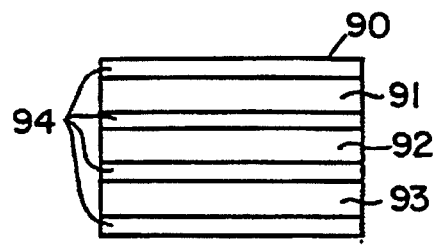
FIGS. 6A–6C are views of the active matrix display 90 of FIG. 3 corresponding to the color scanning of FIGS. 5A–5C.
Figure 5B:
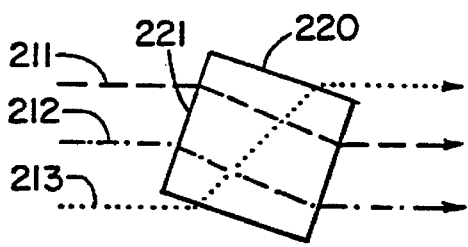
Figure 6B:
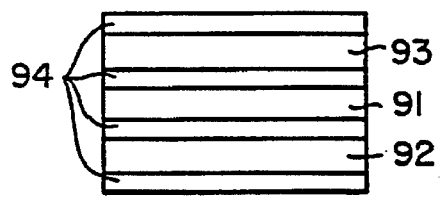
Figure 5C:
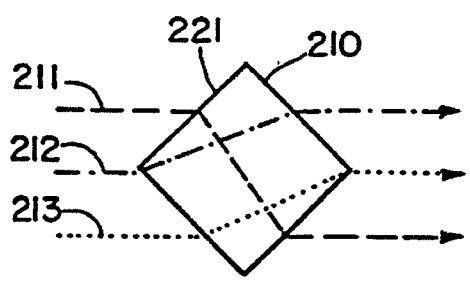

FIGS. 5A–5C are views of the rotating prism 220 of FIG. 4. The prism acts as a tilted parallel plate to move the color stripes as it rotates. When the facing surface 221 is perpendicular to the incident light rays (FIG. 6A) the light rays are passed directly through the prism 220. As the prism is rotated, the facing surface 221 becomes tilted relative to the incident rays (FIG. 6B). The bottom color stripe 213 is scrolled to the top position and the other color stripes 211,212 are scrolled downward. This process is continued in FIG. 5C. Each time a color stripe reaches the bottom, rotating of the prism 220 redirects the color stripe to the top from where the stripe repeats its downward motion.

Returning to FIG. 4, a field lens 230 can be used to align the color stripes exiting from the rotating prism 220 with the active matrix display 90. Using the scanning prism 220, every part of the light valve is exposed equally with rapidly alternating colors and the full spectrum of the light source 200 is utilized at all times. Immediately after a color stripe passes a row of pixels, refresh begins with picture information pertaining to the next color. The dark bands 214 between color stripes accommodate the finite response time of the light valve.

Figure 6C:

A projection lens 240 can be used to project the image generated on the active matrix region 90 to a user. The active matrix region 90 must be addressed and supplied with video information consistent with the scrolling illumination. To this end, the active matrix region 90 is partitioned into three equal height segments as shown in the views of FIGS. 6A–6C.

Each segment is scanned by the row drivers 46a,46b (FIG. 3). The row drivers 46a,46b are enabled sequentially in a fixed top-middle-bottom order. Timing is programmed such that active rows closely track the illumination pattern in each segment. The video data, written to the independent RGB frame buffers 25-xR, 25-xG, 25-xB is retrieved under control of the color select signal 127 offset by one-third of the display height. The RGB data are first time compressed and then line-by-line multiplexed into the serial format required by the column driver 44. FIGS. 6A–6C illustrate the color segments 91,92,93 corresponding to the red stripe 211, green stripe 212 and blue stripe 213 as scrolled in respective FIGS. 5A–5C.

By using color stripes, 100% of the available light is used to at any one time. Additionally, there is reduced variation in the brightness from the top to the bottom of the display because each line is active with each color for exactly the same amount of time. This is not true with color schemes that change the color of the entire display after writing a frame of data where two of the colors have been removed from light being transmitted through the light valve at any one time.

Figure 7:
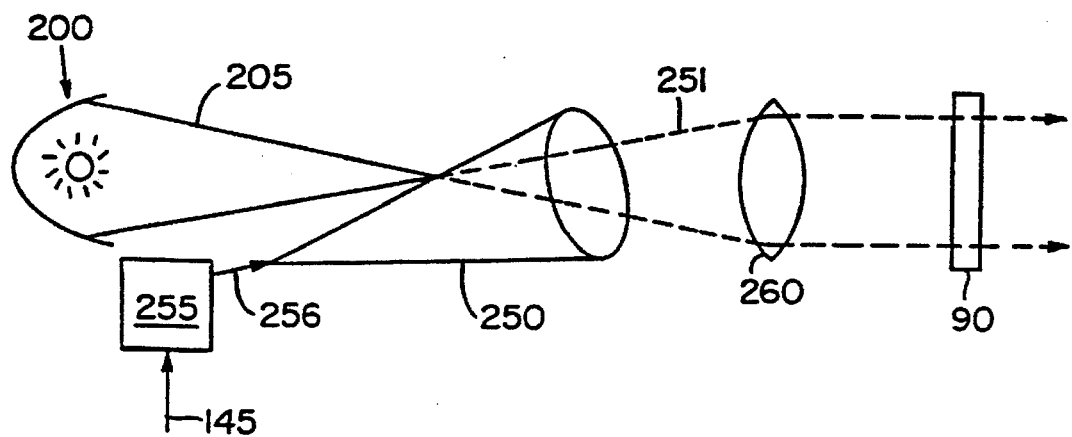
FIG. 7 is a schematic diagram of a preferred embodiment of a color sequential display system using a rotating cone.

FIG. 7 is a schematic diagram of a preferred color sequential system using a rotating color cone. A light source 200 having a reflector generates a white light 205 focused on a cone 250. The cone 250 is divided into three equal segments, one red, one green, and one blue. As the white light 205 becomes incident and passes through the color cone 250, an expanding beam of color light 251 is produced. The color of the colored light 251 is dependent on the color of the cone segment transmitting the light. The color light 251 is focused by a field lens 260 into parallel rays of light which are transmitted through the active matrix region 90.

The color cone 250 is rotated by a motor 255 coupled to the cone 250 by an axle 256. The motor is synchronized to the frequency of the drive signal 145 from the video signal generator 12 of FIG. 2. The color select signal 127 is also synchronized to the retention of the cone 250 to provide data from the red buffer 25-xR, green buffer 25-xG and blue buffer 25-xB in sequence to the column driver 44.

Figure 8:
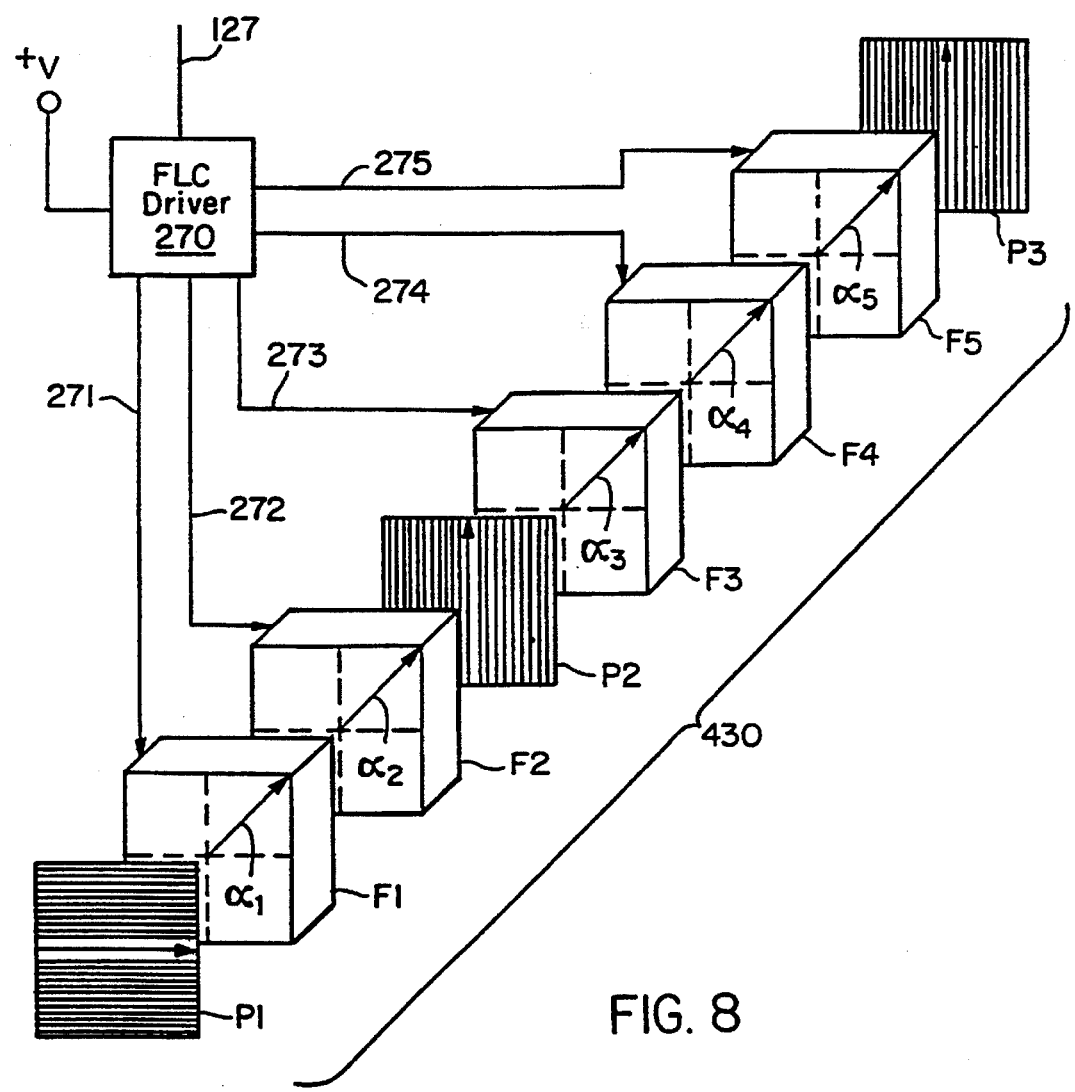
FIG. 8 is a schematic diagram illustrating a preferred embodiment of a ferroelectric liquid crystal color generator.

FIG. 8 is a schematic diagram of a ferroelectric liquid crystal (FLC) color generator according to a preferred embodiment of the invention. Illustrated a two-stage multiple wavelength blocking filter, incorporating fast switching ferroelectric liquid crystal surface stabilized SSFLC cells (F1 ... F5). The stages are defined by polarizers P1 ... P3 and there are two FLC cells F1,F2 in a first stage bounded by crossed polarizers P1,P2 and three FLC cells F3,F4,F5 in a second stage, bounded by parallel polarizers P2,P3. The filter is designed to selectively transmit three visible colors (red, green and blue), and is capable of rapid color switching to generate a visual display of a continuous range of visible colors.

Figure 9:
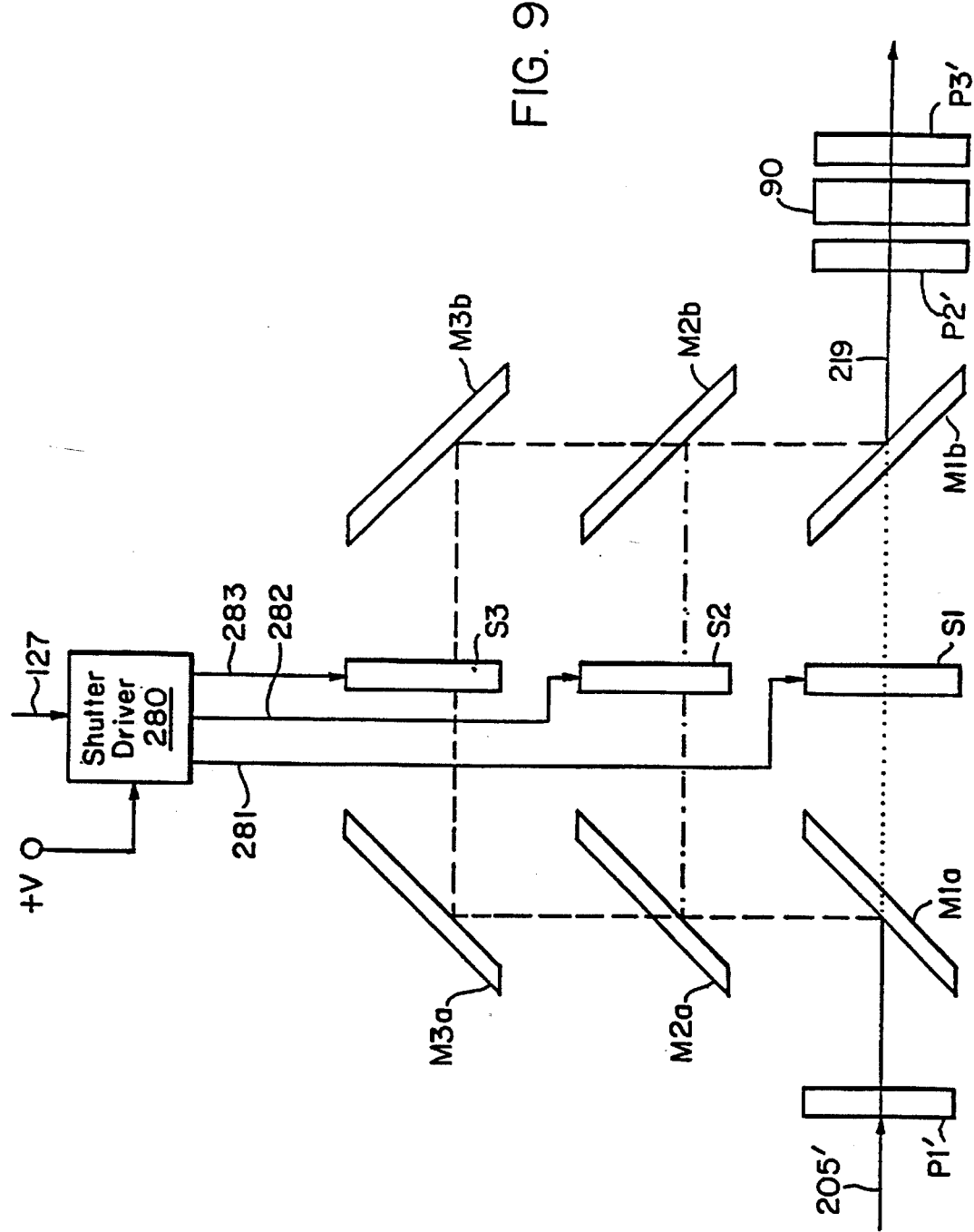
FIG. 9 is a schematic diagram of a preferred color display system utilizing electronically-controlled color shutters.

The two-stage blocking filter of FIG. 9 generates a transmission output centered at 465 nm (blue), 530 nm (green) and 653 nm (red). The filter consists of three independent two-stage birefringent filter designs which are electronically selectable. For each output, the product of the transmission spectrum of each stage yields a narrow highly transmitted band centered at a chosen wavelength, here a primary color, while effectively blocking of all other visible wavelengths. Preferably each stage should have a common maximum centered at a selected color (i.e., primary color). For effective out-of-band rejection, additional maxima for a particular stage must coincide with minima of another stage.

Each selected band to be transmitted (for example, each primary color band) is produced by switching at least one FLC cell in each stage. Switching more than one FLC cell in a particular stage increases retardation, thus changing the transmission spectrum. The blocking filter consists of two stages, one bounded by crossed polarizers P1,P2, the other bounded by parallel polarizers P2,P3. The polarization of each polarizer is shown by the arrows. The filter contains the five FLC cells P1 ... P5, each with a selected thickness of liquid crystal, arranged between the polarizers. The arrows shown on each FLC cell, and the corresponding angles ($\alpha_1$–$\alpha_5$), represent the orientation of the optic axes with respect to the input polarizer. These angles can be either 0 or $\pi/4$ radians. The transmission of the filter is the product of the transmission spectra of the individual stages. A stage with multiple independently switchable FLC cells can produce multiple transmission spectra.

The first stage consists of two FLC cells F1,F2 between the crossed polarizers P1,P2. By switching the second cell F2 ($\alpha_2=\pi/4$), the output is centered in the green (530 nm) and has minima at 446 nm and 715 nm. Switching both cells F1,F2 ($\alpha_1=\alpha_2=\pi/4$) produces a spectrum that has maxima at 465 nm (blue) and 653 nm (red), with a minima at 530 nm.

The second stage consists of three cells F3,F4,F5 between the parallel polarizers P2,P3. With only the fifth cell F5 switched, the output has a maximum at 442 nm (blue) and a minimum at 700 nm. Switching all three cells F3,F4,F5 produces an output having a narrow band centered at 530 nm. The function of the second stage is to narrow the green output (obtained with cell F1 switched), and to select between the blue or red outputs produced when the first stage FLC cells F1,F2 are both switched. Switching the fifth cell F5 blocks the red output of the first stage while transmitting blue output. Switching both the fourth and fifth cells F4,F5 strongly transmits the red at 610 nm, while blocking blue output at 470 nm. Switching all three cells F3,F4,F5 of the second stage narrows the green output (530 nm) from the first stage.

The source spectrum (i.e., white light) can be transmitted by the filter by switching the first FLC cell F1 only. The first cell F1 is a zero order half-waveplate over most of the visible. Therefore, when the first cell F1 is switched, the input polarization is rotated by $\pi/2$ to align with the optic axis of the second cell F2 and the exit polarizer P2. Because the second stage is between parallel polarizers, none of those cells F3,F4,F5 need be switched. A summary of switching requirements necessary to obtain all outputs is provided below in Table 1.

TABLE 1

Summary of Switching Requirements for the FLC Blocking Filter of FIG. 7.

| OUTPUT | $\alpha_1$ | $\alpha_2$ | $\alpha_3$ | $\alpha_4$ | $\alpha_5$ |
|---|---|---|---|---|---|
| WHITE | π/4 | 0 | 0 | 0 | 0 |
| BLUE | π/4 | π/4 | 0 | 0 | π/4 |
| GREEN | 0 | π/4 | π/4 | π/4 | π/4 |
| RED | π/4 | π/4 | 0 | π/4 | π/4 |
| BLACK | 0 | 0 | — | — | — |

The thicknesses of the FLC cells F1 ... F5 are; 1.8 μm, 5.2 μm, 2.6 μm, 1.7 μm, and 6.1 μm, respectively. The cell substrates are two λ/10 optical flats, each having one side coated with an ITO transparent electrode. The alignments layer employed was an oblique vacuum deposited layer of SiO. Typically, the transmission of a single cell without AR coating is 90%. By using HN42HE dichroic polarizers P1 . . . P3, cementing the cells in each stage together with index matching epoxy and AR coating exterior surfaces, the filter can transmit 50% of incident polarized light.

The blocking filters have been described specifically for use with an apparently white light source. They have been designed particularly to produce selected wavelength transmission in the visible spectrum. A more detailed description of tunable filters employing FLC cells is provided by Johnson et al. in U.S. Pat. No. 5,132,826, entitled "Ferroelectric Liquid Crystal Tunable Filters and Color Generators," the teachings of which are incorporated herein by reference. It will be clear to those of ordinary skill in the art that sources other than white light can be employed with FLC blocking filters. The modifications in FLC thickness, choice of materials, source light, etc. required to employ FLC filters for different light sources and in different wavelength region can be readily made by those of ordinary skill in the art.

In blocking filters, the thickness of the FLC cells and the relative orientations of the polarizer elements are selected to optimize transmission of desired wavelengths in the blocking filter and minimize transmission of undesired wavelengths. FLC cells with the required thickness and optical transmission properties for a particular color generation application can be readily fabricated using techniques known to the art. The color blocking filters, like those of FIG. 8 can be readily adapted for temporal color mixing such as for Lyot-type filters. Application of an appropriate voltage duty cycle scheme to switch the desired pairs of FLC cells can generate a range of perceived colors (color space).

In addition, a blocking filter can be designed to transmit the source light (most often white) with no wavelength effect in one switched configuration state, and transmit no light in another switched state (black). FLC pulsing schemes of such a filter can include switching to white and black to allow more flexible selection of generated colors. Blocking filters switching between two selected wavelengths or more than three selected wavelengths can be implemented by appropriate selection of FLC cells (thickness) and positioning and orientation of polarizers. Additional spectral purity of transmitted color (i.e., narrower band width) can be achieved while retaining blocking of unwanted colors by increasing the number of stages in the filter with appropriately selected FLC cells in the stages.

In a preferred embodiment of the invention, chiral smectic liquid crystal (CSLC) cells are used as the FLC cells F1 . . . F5. Color generators using CSLC cells are available from The University of Colorado Foundation, Inc. as described in U.S. Pat. No. 5,243,455. A unique characteristic of CSLC cells is their fast switching speeds (order of 10's to 100's of μsec). Filters of the present invention are capable of >10 kHz tuning rates, for example between two or more discrete wavelengths. In situations where relatively slow response detectors are used, such as with photographic or movie film, or the human eye, pseudo colors can be generated using the rapidly switching filters described herein. Rapid switching between two primary color stimuli can be used to generate other colors, as perceived by the slow detector, which are mixtures of the primary colors. For example, the two monochromatic stimuli, 540 nm (green) and 630 nm (red) can be mixed in various portions to create the perception of orange (600 nm) and yellow (570 nm).

Optically, this mixing can be done by varying the quantity of power of the primary stimuli in a transmission. The same result can be achieved by switching between the two stimuli (spatially superimposed or closely adjacent) at rates faster than the response time of the eye (or any detector which averages over many periods). Color can be generated in this way using the filters described herein by varying the time for which the filter is tuned to any particular primary stimulus compared to another primary stimuli. By changing the percentage of a square wave period during which the filter is tuned to one of the primary stimuli with respect to another (i.e., varying the duty cycle of an applied voltage, for example), there is a perceived generation of colors which are mixtures of the primary inputs. In effect, the quantity of optical power transmitted in each primary stimulus is varied by changing the ratio of time which the filter is tuned to each of the primary bands. Because the response time of the human eye is about 50 Hz, the eye will average optical power over many cycles of filter switching, and many colors can be generated for visual detection.

FIG. 9 is a schematic diagram illustrating a color sequential system using liquid crystal shutters. Liquid crystal cells S1, S2, S3 are used as a light switch instead of mechanical switches or other types of switches. A beam of white light 205' passes through a first polarizer P1' and is divided into blue, green and red components by respective mirrors M1a, M2a, M3a. The first mirror M1a passes blue light to the blue shutter 51 and reflects red and green light to a second mirror M2a. The second mirror M2a receives the red and green light reflected from the first mirror M1a and reflects the green light to the green shutter S2 and passes the red light to the third input mirror M3a. The third mirror M3a reflects the red light toward the red shutter S3. The shutters S1, S2, S3 are controller by a shutter drive 180. The shutter drive 180 is tied to the color select signal 147 from the video signal generator 12 of FIG. 2. The shutter driver decodes the color select signal and actuates the appropriate shutter S1, S2, S3 to pass the corresponding colored light.

If the blue shutter S1 is actuated, the blue light is passed through the first exit mirror M1b. If the green shutter S2 is actuated, the green light is reflected by the second exit mirror M2b and the first exit mirror M1b. If the red shutter S3 is actuated, the red light is reflected by the third exit mirror M3b, passed through the second exit mirror M2b and reflected by the first exit mirror M1b. The selected exit light 119 is then passed through the active matrix region 90 as previously described herein disposed between parallel polarizers P2',P3'. The active matrix display 90 is controlled in conjunction with driver 280 to provide color sequential imaging.

Figure 10A:
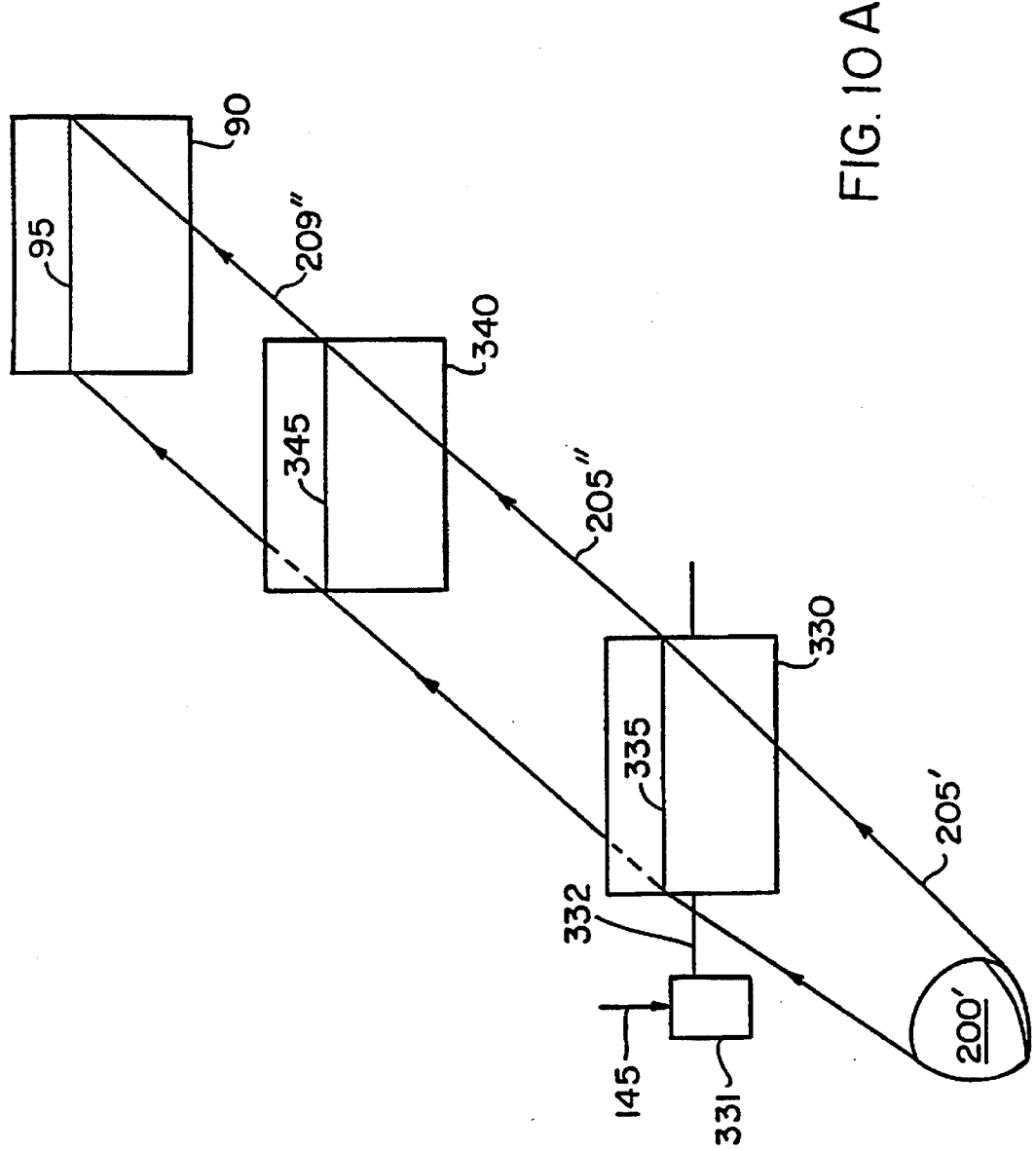
FIGS. 10A–10B are schematic diagram illustrating another preferred embodiment of the invention employing a rotating prism.
Figure 10B:
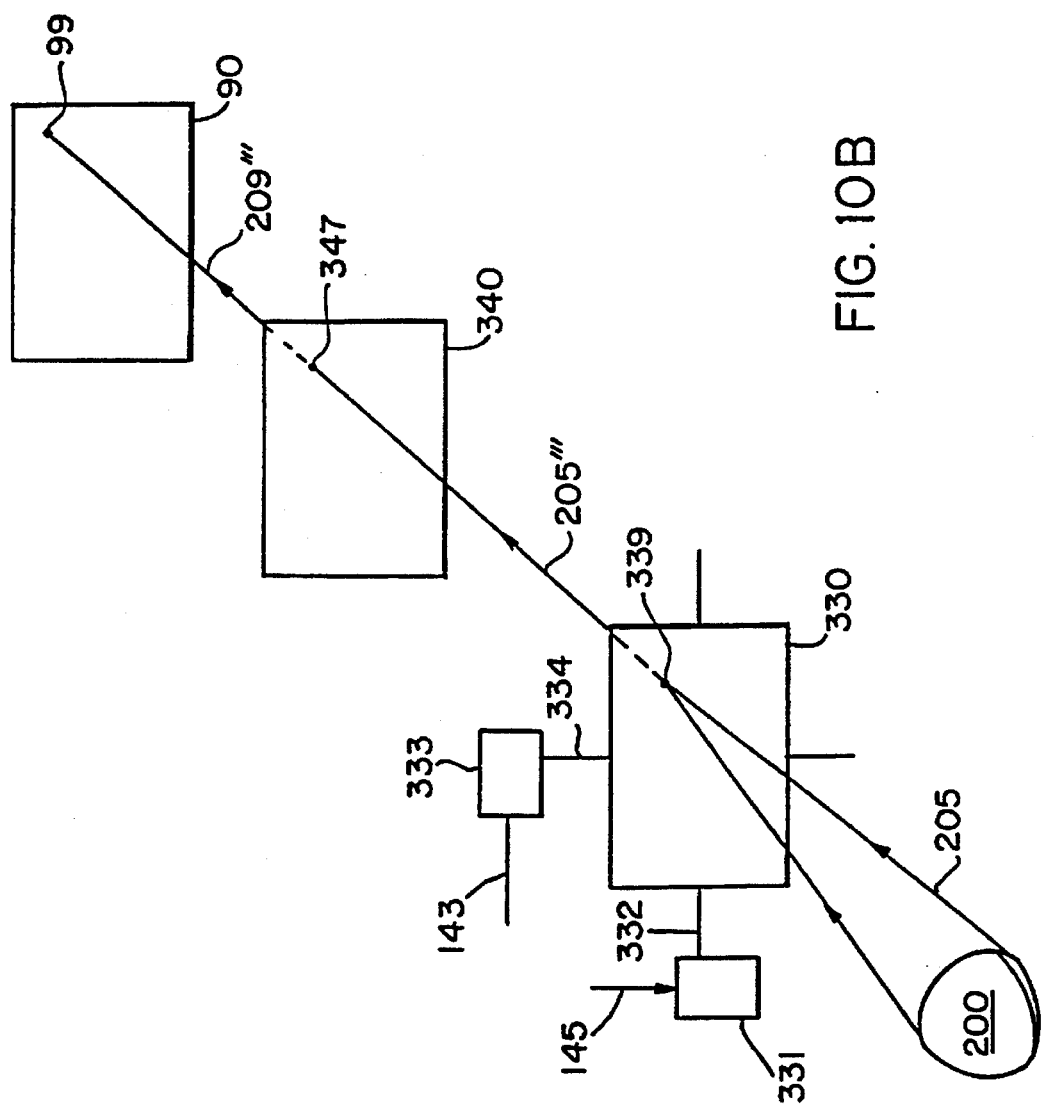

FIGS. 10A-10B are schematic diagrams illustrating another preferred embodiment of the invention employing a rotating prism. In FIG. 10A, a light source 200' generates a strip beam of white light 205', which is focused as a linear horizontal stripe 335 on a deflector 330. The deflector 330 can be tilted relative to the vertical plane by a translator 331. The translator 331 is coupled to the deflector 330 via an axle 332. The translator operates under the control of the drive signal 145 from the video controller signal generator 12 of FIG. 2. As the deflector 330 is rotated, a deflected strip of white light 205" is directed toward a color shutter 340. The optics are aligned such that a strip of light 345 is incident horizontally across the color shutter 340.

The resulting strip of colored light 209" is focused as a color strip 95 on the active matrix region 90. Rotation of the deflector 330 thus results in a color light beam 95 scanning down the active matrix region 90. In the preferred embodiment of the invention, the strip of colored light 95 incident on the active matrix region 90 is registered to a line of pixel electrodes registered to the operation of the translator 331. Although the translator 331 is shown as a mechanical device, an electronically actuated beam deflector 330 could be substituted. In another preferred embodiment of the invention, the lit pixel row 95 can be randomly selected by operation of the deflector 330.

FIG. 10B is a schematic diagram that illustrates the use of a scanning dot or point to illuminate the active matrix region 90. The system of FIG. 10B differs from that of FIG. 10A in that a light source 200 generates a converging beam of light 205, which is focused to be incident at a point 339 on a deflector 330. The deflected white light 205'" is deflected to be incident on the color shutter 340 also at a point 349. The colored beam of light 209'" then becomes incident at a pixel location 99 of the active matrix region 90. The deflector 330 is controlled by a vertical translator 331 as in FIG. 10A and a horizontal translator 333. The vertical translator 331 is controlled by the control signal generator 12 of FIG. 2 by the row address signal 125. The horizontal translator 333 is controlled by the video control generator 12 of FIG. 2 via the pixel data signal 142.

The pixel 99 of the active matrix display region 90 is registered to the movement of the translators 331,333 such that the translators can position of the deflector 330 in a plurality of discrete orientations, one discrete orientation for each pixel of the active matrix region 90. As discussed with regard to FIG. 10A, the beam deflector 330 can be electronically actuated. In addition, the beam can be scanned across the active matrix region 90 in a raster scan fashion.

Equivalents

Those skilled in the art will know, or be able to ascertain using no more than routine experimentation, many equivalents to the specific embodiments of the invention described herein. These and all other equivalents are intended to be encompassed by the following claims.

The invention claimed is:

1. An integrated circuit random access video display for displaying an image from a video source, the integrated circuit comprising:
   an active matrix display region having an array of pixel electrodes and an array of pixel transistors, the pixel transistors formed from single crystal silicon material and registered to the array of pixel electrodes for actuating the pixel electrodes in response to an active matrix drive signal; and
   an active matrix control circuit interconnected to the active matrix display region for translating a video signal received from the video source into active matrix drive signals, the active matrix drive signals including a line clock signal and a selectable line address signal for random access addressing of selected pixel transistors, the active matrix control circuit including:
   an addressing circuit for randomly addressing the selected pixel transistors and generating the line address signal;
   at least one random access select line scanner for enabling an addressed row of pixel transistors in response to the line clock signal and the line address signal; and
   a column driver for providing an actuation signal to the enabled row of pixel transistors.

2. The integrated circuit of claim 1 wherein the video signal is a composite video signal.

3. The integrated circuit of claim 1 wherein the video signal is an analog RGB signal.

4. The integrated circuit of claim 1 further comprising a video controller for providing timing information to the select scanner and column driver.

5. The integrated circuit of claim 1 further comprising a video memory for storing at least one video image from digital data representing the video image.

6. The integrated circuit of claim 5 wherein the video memory comprises at least one frame buffer.

7. The integrated circuit of claim 1 wherein the array of pixel electrodes is at least a 1280×1024 array.

8. The integrated circuit of claim 1 wherein the pixel electrodes are individually addressable by the control circuit.

9. The integrated circuit of claim 1 wherein the array of pixel transistors are bonded to a substrate with an adhesive.

10. The integrated circuit of claim 1 wherein the active matrix drive signals further include a plurality of video data channels for providing actuation signals to the selected pixel transistors.

11. The integrated circuit of claim 10 wherein the control circuit selects a range of display rows which are to display a selected color from a plurality of displayable colors.

12. The integrated circuit of claim 11 wherein the range of display rows is a plurality of contiguous display rows.

13. The integrated circuit of claim 10 wherein the video channels are arranged so as to reduce interference between the channels.

14. The integrated circuit of claim 1 wherein the active matrix control circuit facilitates center-to-edge and edge-to-center addressing of the pixel transistors.

15. The integrated circuit of claim 1 wherein the active matrix control circuit transmits the address signal over a line address bus.

16. The integrated circuit of claim 1 wherein the active matrix control circuit scans the active matrix display region in a non-linear pattern.

17. A color sequential active matrix display system for displaying a color image from a video source, the system comprising:
   a light source for generating light;
   an integrated circuit random access video display including an active matrix display region interconnected with a control circuit, the display region having an array of pixel electrodes, an array of pixel transistors and an active matrix control circuit, the pixel transistors formed from single crystal silicon material and registered to the pixel electrodes, the control circuit translating a video signal received from the video source into active matrix drive signals which include a line clock signal and a selectable line address signal for random access addressing of selected pixel transistors, the selected pixel transistors actuating the pixel electrodes in response to the active matrix drive signals, the control circuit including:

an addressing circuit for randomly addressing the selected pixel transistors and generating the line address signal;

at least one random access select line scanner for enabling an addressed row of pixel transistors in response to the line clock signal and the line address signal;

a column driver for providing an actuation signal to the enabled row of pixel transistors; and an optical system coupling the video display to the light source, the optical system separating light from the light source into a plurality of colors, each color being directed onto each pixel electrode in temporal sequence.

18. The color sequential active matrix display system of claim 17 wherein the plurality of colors comprises red, green and blue.

19. The color sequential active matrix display system of claim 17 wherein the optical system includes a rotating prism.

20. The color sequential active matrix display system of claim 17 wherein each color is directed onto a plurality of contiguous lines of electrodes.

21. In an integrated circuit random access video display, a method of displaying an image from a video source, comprising the steps of:

providing an active matrix display region having an array of pixel electrodes and an array of pixel transistors, the pixel transistors formed from single crystal silicon material and registered to the array of pixel electrodes for actuating the pixel electrodes in response to an active matrix drive signal;

providing an active matrix control circuit interconnected to the active matrix display region; and in the control circuit, translating a video signal received from the video source into active matrix drive signals, the active matrix drive signals including a line clock signal and a selectable line address signal for random access addressing of selected pixel transistors by the steps of:

in an addressing circuit, randomly addressing the selected pixel transistors and generating the line address signal;

an at least one random access select line scanner, enabling an addressed row of pixel transistors in response to the line clock signal and the line address signal; and in a column driver, providing an actuation signal to the enabled row of pixel transistors.

22. The method of claim 21 further comprising the step of providing timing information from a video controller to the select scanner and column driver.

23. The method of claim 21 further comprising the step of storing at least one video image in a video memory from digital data representing the video image.

24. The method of claim 21 wherein the step of translating further comprises providing actuation signals to the selected pixel transistors using a plurality of video data channels.

25. The method of claim 24 wherein the step of translating further comprises selecting a range of display rows which are to display a selected color from a plurality of displayable colors.

26. The method of claim 24 wherein the step of providing actuation signals further comprises arranging the video channels so as to reduce interference between the channels.

27. The method of claim 21 wherein the step of translating further comprises transmitting the address signal over a line address bus.

28. The method of claim 21 wherein the step of translating further comprises scanning the active matrix display region in a non-linear pattern.

* * * * *